June 26, 1962   J. L. BOHN ETAL   3,040,627
ROTATING MIRROR
Filed March 3, 1961
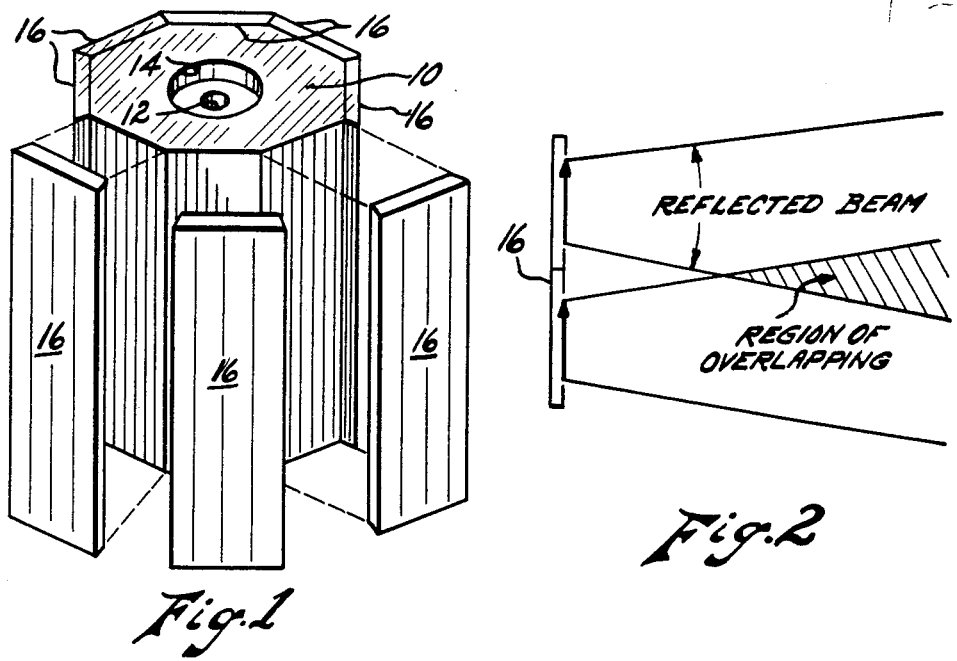
Fig.1
Fig.2
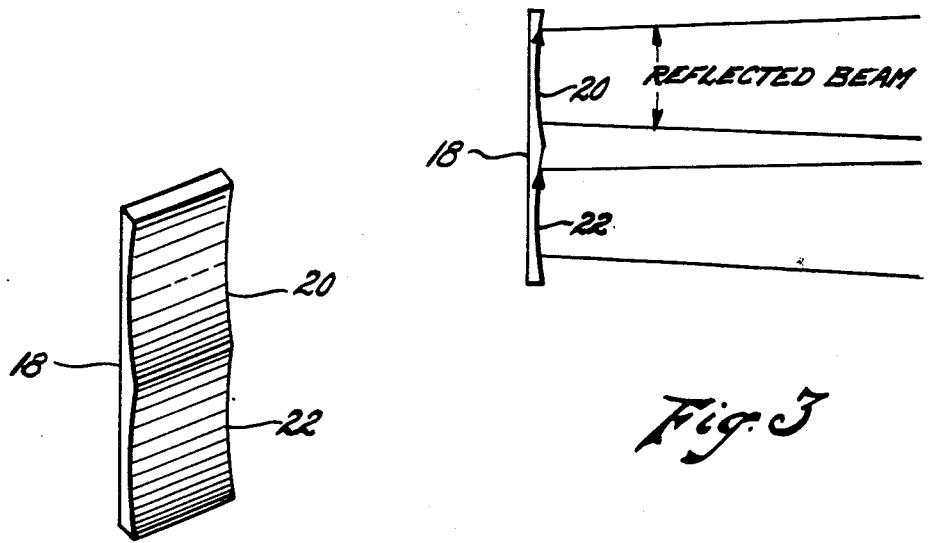
Fig.4
Fig.3
INVENTORS
JACOB LLOYD BOHN
FRANCIS N. NADAS
THEODORE KORNEFF
BY
ATTORNEYS United States Patent Office 3,040,627
Patented June 26, 1962

3,040,627
ROTATING MIRROR
Jacob Lloyd Bohn, Glenside, and Francis H. Nadig, Philadelphia, Pa., and Theodore Korneff, Burlington, N.J., assignors to the United States of America as represented by the Secretary of the Air Force
Filed Mar. 3, 1961, Ser. No. 93,275
1 Claim. (Cl. 88—84)

This invention relates generally to mirrors and more particularly to a structure and method for manufacturing rotary mirrors suitable for use in high speed photography.

An example of a high speed optical system for photography of exploding wire phenomenon may be found in our copending application Serial Number 769,048, filed October 22, 1958, now Patent Number 2,961,918. In high speed photography, the strength and weight of the rotating mirror in effect sets a limitation on the speed of the photography in that these factors affect the rotational speed of the mirror. In addition, the cost of the rotating mirrors is usually high; however, a material reduction in cost may be effected by the use of our new structural arrangement which enables mass production of rotating mirrors.

When a multiplication of images by means of increasing the number of optical systems, as disclosed in our copending applications Serial Number 847,854, filed October 21, 1959, and Serial Number 857,475, filed December 4, 1959, now U.S. Patent No. 3,012,470, was used, it was found that overlapping of the images formed by the upper and lower halves of the rotating mirror could occur. The novel rotating mirror construction of this invention allows for the correction of this phenomenon by incorporating cylindrically curved mirror sections.

Accordingly, it is an object of this invention to provide a novel rotating mirror structure which is adapted to accommodate corrective mirror curvatures.

It is another object of this invention to provide a novel rotating mirror structure of light weight and high strength which is capable of higher rotational speeds than that heretofore achieved.

It is still another object of this invention to provide a rotating mirror structure which is economical to produce of conventional, currently available materials that lend themselves to standard mass production manufacturing techniques.

It is a further object of this invention to provide a rotating mirror arrangement suitable for use in multiple optical systems for image multiplication to avoid overlapping of images.

These and other advantages, features and objects of the invention will become more apparent from the following description taken in connection with the illustrative embodiments in the accompanying drawings, wherein:

FIGURE 1 is a partially exploded view of the rotating mirror structure of this invention;

FIGURE 2 is a diagrammatic representation of overlapping of images in a multiple optical system using a rotating mirror;

FIGURE 3 is a diagrammatic representation of the results of utilizing a corrective mirror arrangement; and FIGURE 4 is an isometric view of a mirror insert to be substituted for those shown in FIGURE 1 in order to effectuate the correction illustrated in FIGURE 3.

Referring to FIGURE 1, there is shown a strong, light-weight aluminum blank 10 having a hole 12 therethrough which may be counterbored at 14 in order to connect the mirror blank with the shaft of a rotating mechanism. The outer circumference of the blank 10 to form a multi-faced prism in order to provide a number of mirror surfaces. The preferred polygonal form of the blank is here shown as an octagon. A series of optically flat glass mirror surfaces 16, ground and polished prior to assembly, are adhesively bonded to the aluminum blank 10. Five of the mirror surfaces 16 are shown secured to the blank 10 in FIGURE 1 parallelogram sides while the remaining three mirror surfaces 16 are shown prior to bonding with standard epoxy based adhesive.

When the flat segments in rotating mirror of FIGURE 1 are used in the systems described in our applications Serial Numbers 847,854 and 857,475, filed October 21, 1959, and December 4, 1959, respectively, the possibility of overlapping of images formed by the upper half and the lower half of the mirror segment 16 may be demonstrated by the region of overlapping designated in FIGURE 2. This region may be eliminated as shown in FIGURE 3 by utilizing a mirror segment 18 having cylindrically curved sections 20 and 22.

A segment 18 is shown more clearly in FIGURE 4 and would be adhesively bonded to the prismatic aluminum blank 10 in the manner described relative to segments 16 in FIGURE 1. If desired, curved portions 20 and 22 of segment 18 could be separate mirror elements which comprise segment 18 when these elements are bonded to the aluminum blank.

Thus, it can be seen from the foregoing that a rotating mirror structure capable of high speed operation has been presented.

Although the invention has been described with reference to particular embodiments, it will be understood to those skilled in the art that the invention is capable of a variety of alternative embodiments within the spirit and scope of the appended claim.

We claim:

A rotatable mirror for use in high speed photography comprising a lightweight, high strength prismatic shaped blank having a central axis through its polygonal ends for rotation of said blank, and a glass mirror secured to each parallelogram of said blank, each of said glass mirrors having cylindrical curvatures forming plano-concave mirror sections lying in the direction of the axis of said blank.

References Cited in the file of this patent

UNITED STATES PATENTS

| 1,937,378 | Alexanderson | Nov. 28, 1933 |
| 2,909,204 | Somerville | Oct. 20, 1959 |

FOREIGN PATENTS

| 22,569 | Great Britain | Oct. 13, 1911 |
| 27,102 | Great Britain | of 1903 |
| 670,960 | Great Britain | Apr. 30, 1952 |